United States Patent
Bell et al.

(10) Patent No.: US 7,462,073 B2
(45) Date of Patent: Dec. 9, 2008

(54) DOCKING MODULE COMPRISING A DC-DC CHARGER

(75) Inventors: Jory Bell, San Francisco, CA (US); Jonathan Betts-LaCroix, Chatsworth, CA (US)

(73) Assignee: OQO Incorporated, San Francisco, CA (US)

( * ) Notice: Subject to any disclaimer, the term of this patent is extended or adjusted under 35 U.S.C. 154(b) by 0 days.

(21) Appl. No.: 11/503,022

(22) Filed: Aug. 11, 2006

(65) Prior Publication Data

US 2007/0042637 A1 Feb. 22, 2007

Related U.S. Application Data

(63) Continuation-in-part of application No. 11/049,767, filed on Feb. 3, 2005, now Pat. No. 7,285,021.

(60) Provisional application No. 60/541,961, filed on Feb. 4, 2004.

(51) Int. Cl.
*H01R 25/00* (2006.01)
(52) U.S. Cl. .................. 439/639; 439/638; 439/505
(58) Field of Classification Search .......... 439/502, 439/623, 505, 498, 638–639; 323/222, 282
See application file for complete search history.

(56) References Cited

U.S. PATENT DOCUMENTS

| | | | | |
|---|---|---|---|---|
| 5,200,685 A | * | 4/1993 | Sakamoto | 320/103 |
| 5,734,254 A | * | 3/1998 | Stephens | 320/106 |
| 5,836,783 A | * | 11/1998 | Morisawa et al. | 439/502 |
| 5,886,424 A | * | 3/1999 | Kim | 307/64 |
| 6,075,345 A | * | 6/2000 | Lee | 320/138 |
| 6,172,891 B1 | * | 1/2001 | O'Neal et al. | 363/146 |
| 6,407,914 B1 | * | 6/2002 | Helot | 361/686 |
| 6,628,517 B1 | * | 9/2003 | Helot et al. | 361/686 |
| 6,690,585 B2 | | 2/2004 | Betts-LaCroix | |
| 6,955,292 B2 | * | 10/2005 | Nakamura et al. | 235/375 |
| 7,224,086 B2 | * | 5/2007 | Germagian et al. | 307/128 |
| 2002/0194468 A1 | | 12/2002 | Betts-LaCroix | |
| 2003/0222503 A1 | * | 12/2003 | Lam et al. | 307/38 |
| 2004/0009709 A1 | * | 1/2004 | Ooishi | 439/638 |
| 2005/0060467 A1 | * | 3/2005 | Wieck | 710/303 |
| 2005/0185364 A1 | | 8/2005 | Bell et al. | |

* cited by examiner

*Primary Examiner*—Renee S Luebke
*Assistant Examiner*—Vanessa Girardi
(74) *Attorney, Agent, or Firm*—Mattingly, Stanger, Malur & Brundidge, PC

(57) ABSTRACT

In one embodiment, a cable connects a computing device to both an external power source and one or more peripheral devices. The cable may include a docking module including an AC adaptor for connecting to an external AC power source, and a DC-DC charger, coupled to the AC adaptor, for transmitting power to the computing device over a segment of the cable. The docking module may also include one or more connectors adapted to connect to one or more peripheral devices. In another embodiment, a device connects a computing device to an external power source. The device includes a first cable segment and a DC-DC charger suitable for transmitting power to the computing device over the first cable segment. The device includes a second cable segment connecting the DC-DC charger to an AC adaptor suitable for connection to an external power source.

9 Claims, 5 Drawing Sheets

DOCKING MODULE COMPRISING A DC-DC CHARGER

CROSS REFERENCE TO RELATED APPLICATIONS

This application is a continuation-in-part of commonly-owned U.S. patent application Ser. No. 11/049,767, entitled "Docking Cable," filed on Feb. 3, 2005, now U.S. Pat. No. 7,285,021, which claims priority from U.S. Prov. Pat. App. Ser. No. 60/541,961, entitled "Docking Cable," filed on Feb. 4, 2004, both of which are incorporated by reference herein.

BACKGROUND

1. Field of the Invention

The present invention relates to cables for use in computer systems and other electronic devices.

2. Related Art

Various kinds of input/output (I/O) cables are used to connect computing devices and peripheral devices to each other. For example, referring to FIG. 1A, a prior art I/O adaptor cable is shown which connects to a first connector 102a on a computing device and to a second connector 102b on a peripheral device. Because the connectors 102a-b may differ from each other, one purpose of the I/O adaptor cable 100a is to adapt signals from the computer connector 102a to the peripheral connector 102b.

Referring to FIG. 1B, a first prior art port expander cable 100b is shown which breaks out signals in a multifunction connector 104a on a computing device to individual device connectors 104b-d at the ends of multiple cables 106a-c, each of which may be connected to a distinct peripheral device.

Referring to FIG. 1C, a second prior art port expander cable 100c is shown which connects at a first multifunction connector 108a on a computing device and to individual device connectors 108b-d at the ends of multiple cables 110a-c, each of which may be connected to a distinct peripheral device. A single cable 110d, which is connected to connector 108a, breaks into individual cables 110a-c.

Referring to FIG. 1D, a third prior art port expander cable 100d is shown which connects at a first multifunction connector 112a on a computing device. Cable 114 is connected on one end to connector 112a and on the other end to a rigid multi-connector module 116. Module 116 includes connectors 118a-c, each of which may be connected to a distinct peripheral device.

Various kinds of power cables are used to connect computing devices to external power sources. When a computing device is connected both to an external power source and to a large number of peripheral devices, the number of power and I/O cables connected to the computing device can grow large. Furthermore, the total length, volume, and mass of such cables can also grow large, making the cables unwieldy to connect, manage, and transport. Computer users have long complained of the cluttered "rat's nest" of cables behind every desktop computer. The aggravation caused by such cables is exacerbated in the context of mobile computing devices, for which compactness and ease of transport is highly valued.

Designers of mobile computing devices and associated peripherals therefore face the challenge of designing cables which create minimal clutter, and which have minimal length, volume, and mass, without reducing the functionality or ease of use either of the cables or of the associated computing devices and peripherals.

SUMMARY

One aspect of the present invention is directed to a cable suitable for connecting a computing device to both an external power source and one or more peripheral devices. The cable may, for example, include a docking module including an AC adaptor for connecting to an external AC power source, and a DC-DC charger, coupled to the AC adaptor, for transmitting power to the computing device over a segment of the cable. The docking module may also include one or more connectors adapted to connect to one or more peripheral devices. The docking module may receive one or more signals from the peripheral device(s), and transmit the signal(s) to the computing device over the cable segment. The docking module may transmit both power and other signals to the computing device through the cable segment.

Another aspect of the present invention is directed to a device for connecting a computing device to an external power source. The device includes a first cable segment and a DC-DC charger suitable for transmitting power to the computing device over the first cable segment. The device also includes a second cable segment and an AC adaptor suitable for connection to an external power source. The DC-DC charger is connected to the AC adaptor by the second cable segment. The DC-DC charger may be a component of a docking module connected between the computing device and the AC adaptor. The docking module may include one or more connectors adapted to connect to one or more peripheral devices. The docking module may receive one or more signals from the peripheral device(s), and transmit the signal(s) to the computing device over the first cable segment. The second cable segment may be detachable from the docking module, and may be connectable to a second docking module.

DETAILED DESCRIPTION

One aspect of the present invention is directed to a cable suitable for connecting a computing device to both an external power source and one or more peripheral devices. The cable may, for example, include a docking module including an AC adaptor for connecting to an external AC power source, and a DC-DC charger, coupled to the AC adaptor, for transmitting power to the computing device over a segment of the cable. The docking module may also include one or more connectors adapted to connect to one or more peripheral devices. The docking module may receive one or more signals from the peripheral device(s), and transmit the signal(s) to the computing device over the cable segment. The docking module may transmit both power and other signals to the computing device through the cable segment.

Figure 1A:
FIGS. 1A-1D are diagrams of prior art I/O cable configurations.
Figure 1B:
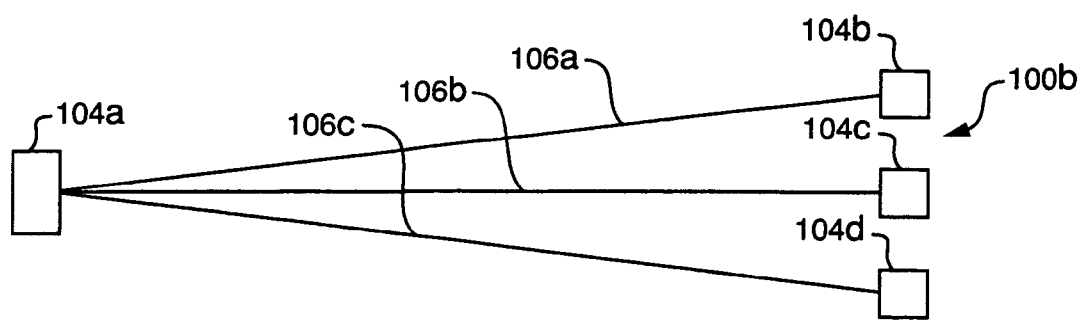
Figure 1C:
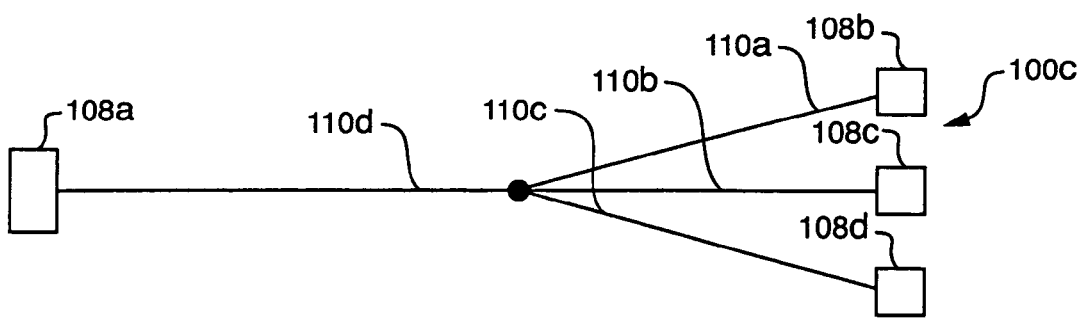
Figure 1D:
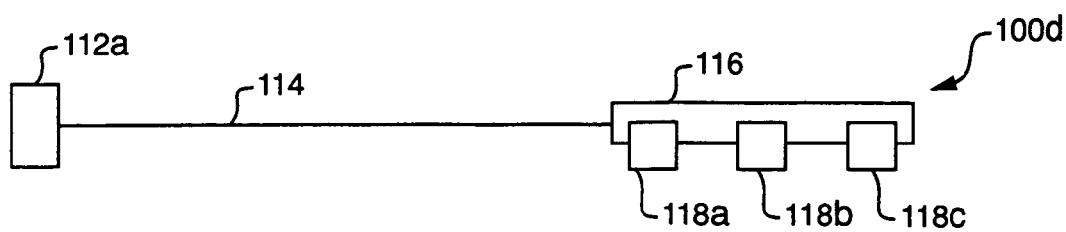
Figure 2:
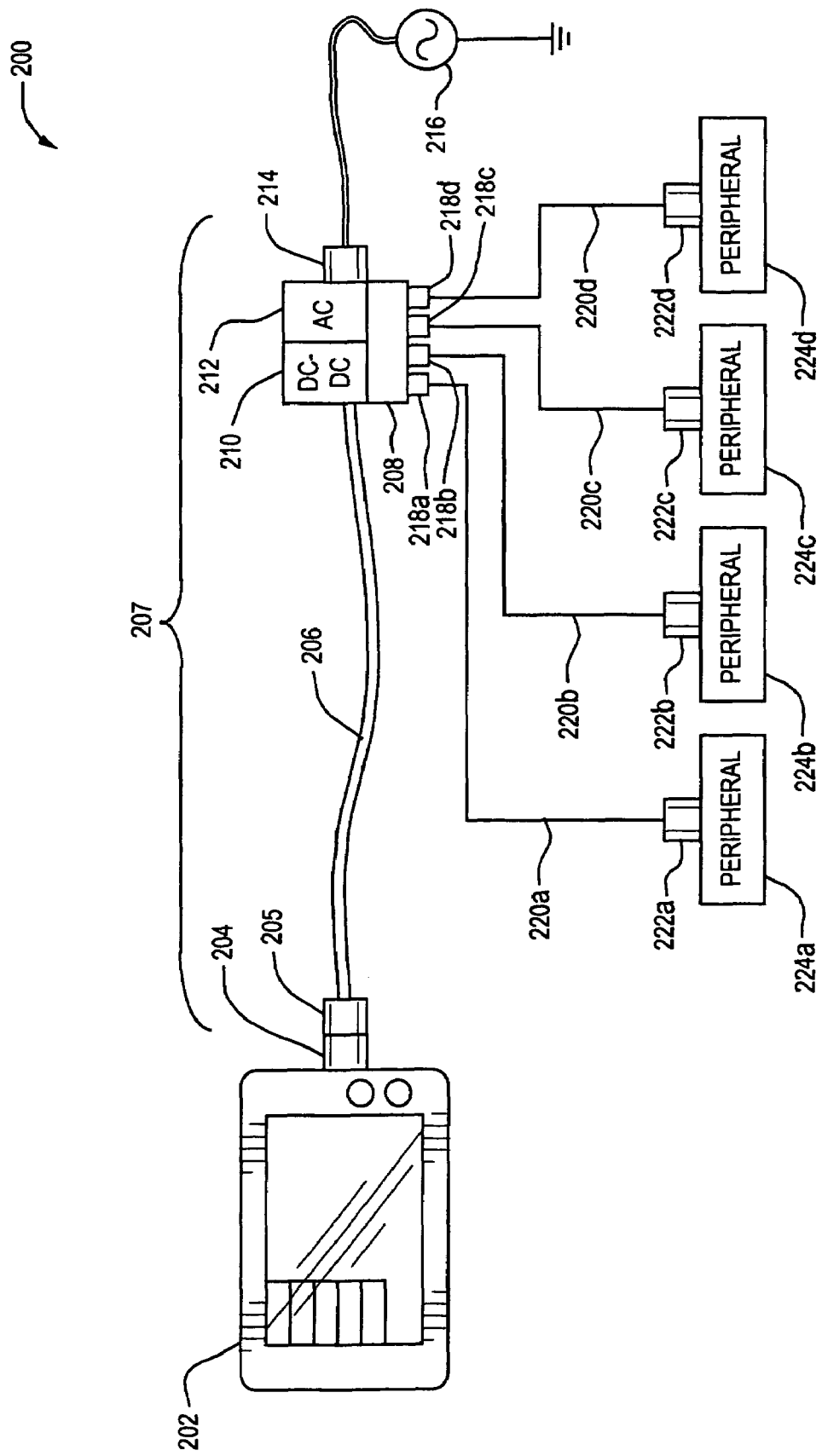
FIG. 2 is a diagram of a system including a combined power/docking cable according to one embodiment of the present invention.

Referring to FIG. 2, a diagram is shown of a system 200 according to one embodiment of the present invention. The system 200 includes a cable 207 for connecting a computing device 202 to a power source 216 and to one or more peripheral devices 224a-d. The cable 207 includes a segment 206 having one or more connectors 205 for connecting to one or more ports 204 on the computing device 202, and a docking module 208 for connecting to the power source 216 (via plug 214) and peripheral device(s) 224a-d (via cables 220a-d connected between connectors 218a-d and connectors 222a-d, respectively).

The cable 207 transmits to the computing device 202 both a power signal from the power source 216 and I/O signals from the peripheral device(s) 222a-d. The docking module 208 includes an AC adaptor 212 and a DC-DC charger 210 (which may, for example, be used to step up and/or step down the voltage of the power signal received from the AC adaptor 212). The docking module 208 may also transfer power from the computing device 202, over cable segment 206, to one or more of the peripheral devices 224a-d, in instances in which the docking module 208 is not connected to the external power source 216, and in which one or more of the peripherals 224a-d requires additional power.

The power signal transmitted over cable segment 206 by the docking module 208 may, for example, be a low voltage, high DC current power signal. The DC-DC charger 210 may include a step-up converter and/or a step-down converter. The DC-DC charger 210 may include means for transferring power from the computing device 202 over the cable 207 to the peripheral devices 224a-d. The DC-DC charger 210 may, for example, be implemented using techniques described in U.S. Pat. No. 6,690,585, entitled "Bi-directional DC power conversion system," issued on Feb. 10, 2004, hereby incorporated by reference herein.

Although only a single port 204 is shown on the computing device 202 in FIG. 2, and only a single corresponding connector 205 is shown on the cable 207, the cable 207 may have any number of connectors for connecting to any number and kind of ports on the computing device 202. Similarly, although four connectors 218a-d are shown on the docking module 208 for connecting to four peripheral devices 224a-d, the docking module 208 may have any number and kind of connectors for connecting to any number and kind of peripheral devices. Examples of such connectors include Universal Serial Bus (USB) connectors, audio connectors, IEEE standard 802.3 (i.e. Ethernet) connectors, and Video Graphics Array (VGA) connectors. For example, in one embodiment of the present invention, the docking module 208 includes a USB connector, an audio connector, an IEEE standard 802.3 connector, and a VGA connector.

The computing device 202 may be any kind of computing device, such as any of the kinds of computing devices disclosed in the above-referenced U.S. patent application Ser. No. 11/049,767, entitled "Docking Cable," or any of the patents and patent applications referenced therein. For example, the computing device 202 may be a handheld computing device, such as the model 01 or model 01+ handheld computer, available from OQO, Inc. of San Francisco, Calif.

The docking module 208 receives AC power from the power source 216, converts the power signal to DC, and performs a step-up or step-down conversion on the power signal. The docking module 208 also receives one or more I/O signals from the peripheral devices 224a-d. The docking module 208 transmits the converted power signal and the one or more I/O signals over the cable segment 206 to the computing device 202. Note that the I/O signals may include data and/or control signals. The cable segment 206 may include a single line, and both the power signal and I/O signal(s) may be transmitted to the computing device 202 over that single line.

Figure 3:
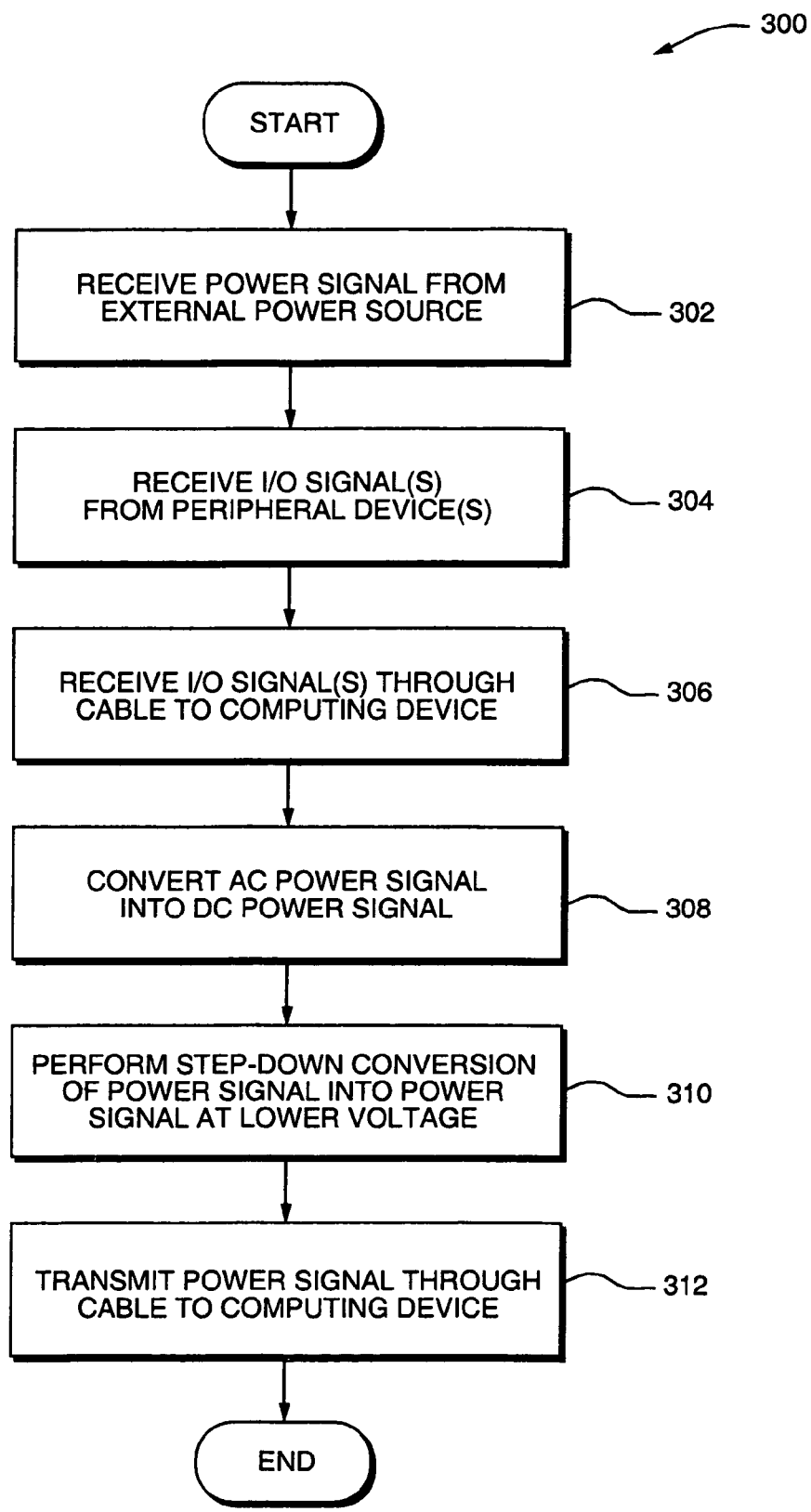
FIG. 3 is a flowchart of a method performed by the system of FIG. 2 according to one embodiment of the present invention.

Referring to FIG. 3, a flowchart is shown of a method 300 performed by the docking module 208 of FIG. 2 according to one embodiment of the present invention. The docking module 208 receives a power signal from the AC power source 216 at port 214 (step 302). The docking module 208 also receives (at one or more of ports 218a-d) one or more I/O signals transmitted on one or more of cables 220a-d by one or more of the peripheral devices 224a-d (step 304). The docking module 208 transmits the I/O signal(s) through the cable segment 206 to computing device 202 (step 306).

The docking module 208 converts the AC power signal received from the power source 216 into a DC signal (step 308). The DC-DC charger 210 performs a step-down conversion of the direct current power signal from a first (higher) voltage to a second (lower) voltage (step 310). The docking module 208 transmits the converted and stepped-down DC power signal through the cable segment 206 to the computing device 202 (step 312). In other words, the docking module 208 transmits both a power signal and one or more I/O signals through the cable segment 206 to the computing device 202.

The docking module 208 may also transfer power from computing device 202 over cable segment 206 to one or more of the peripheral devices 224a-d (step 314). Such transfer of power may be useful, for example, when one or more of the peripheral devices 224a-d is not connected to another external power source.

Advantages of various embodiments of the present invention include, but are not limited to, the following. Use of a single cable segment 206, and a consolidated docking module 208 having multiple ports 218a-d for connecting to the peripheral devices 224a-d reduces the clutter typically produced by the large number of cables needed to connect a computing device to multiple peripheral devices. Furthermore, even though multiple cables 220a-d are still used to connect to the peripheral devices 224a-d in the embodiment shown in FIG. 2, these cables 224a-d are physically separated from the computing device 202, thereby reducing the clutter near the computing device 202.

Furthermore, the docking module 208 shown in FIG. 2 enables the I/O ports 218a-d to be closer to the power source 216 than in a conventional computing system, in which the I/O ports are on the computing device itself. This is advantageous because it further reduces the size of the computing device 202 in its undocked mode.

Separation of the AC adaptor 212 and DC-DC charger 210 from the computing device 202 and into the docking module 208 reduces the size of the computing device 202 in comparison to conventional computing devices, which typically include an AC adaptor and/or DC-DC charger. Reduction of the size of the computing device 202 can be beneficial for a variety of reasons, such as reducing the cost of designing and manufacturing the computing device 202, and making the computing device 202 more mobile.

As described above, the cable segment 206 may include a single line that both carries power from the power source 216 into the computing device 202 and I/O signals from the peripheral devices 224a-d into the computing device 202. The use of a single line to perform both these functions enables the cable 207 to be thinner and lighter than a cable requiring multiple lines for the same purpose.

Furthermore, use of the cable 207 may enable the number of ports on the computing device 202 to be reduced, to as a few as a single port having multiple connectors for receiving both power and I/O signals.

Another aspect of the present invention is directed to a device for connecting a computing device to an external power source. The device includes a first cable segment and a DC-DC charger suitable for transmitting power to the computing device over the first cable segment. The device also includes a second cable segment and an AC adaptor suitable for connection to an external power source. The DC-DC charger is connected to the AC adaptor by the second cable segment. The DC-DC charger may be a component of a docking module connected between the computing device and the AC adaptor. The docking module may include one or more connectors adapted to connect to one or more peripheral devices. The docking module may receive one or more signals from the peripheral device(s), and transmit the signal(s) to the computing device over the first cable segment. The second cable segment may be detachable from the docking module, and may be connectable to a second docking module.

Figure 4A:
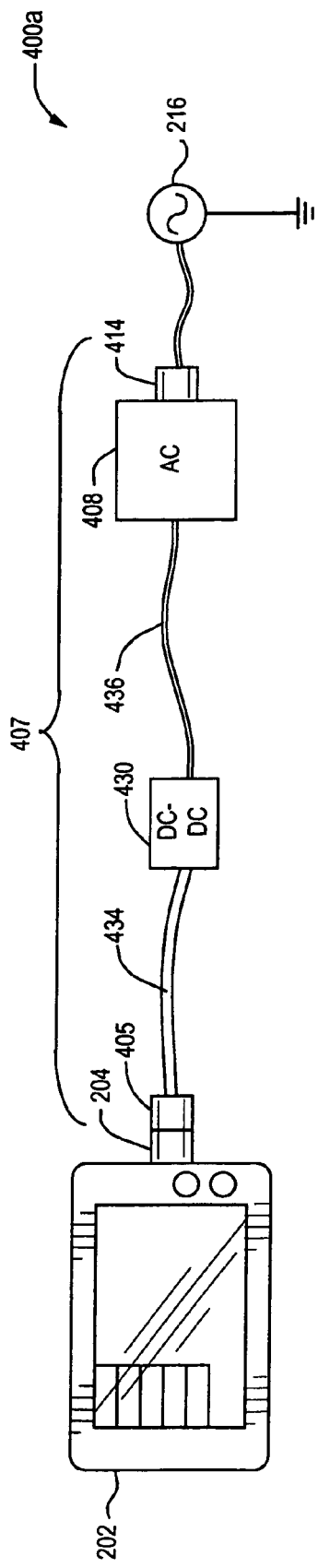
FIG. 4A is a diagram of a power cable according to one embodiment of the present invention.

Referring to FIG. 4A, a diagram is shown of a system 400a according to another embodiment of the present invention. The system 400a includes a cable 407 for connecting computing device 202 to power source 216. The cable 407 includes one or more connectors 405 for connecting to one or more ports 204 on the computing device.

The cable 407 includes an AC adaptor 408, which may be a standard off-the-shelf AC adaptor. The cable 407 also includes a DC-DC charger 430, connected to the AC adaptor 408 by a high-voltage, low current cable segment 436. The cable segment 436 may be made to be as thin as a standard household AC power cable, since it carries only AC power.

The DC-DC charger 430 may, for example, be used to step up and/or step down the voltage of the power signal received from the AC adaptor 408. The DC-DC charger 430 is connected to a cable segment 434, which may be thicker than cable segment 436. The cable 407 is terminated at connector 405. The cable 407, therefore, runs from connector 414 at the power source 416 to connector 405 at the computing device 202.

The DC-DC charger 430 may have other features of the DC-DC charger 210 shown in FIG. 2, and may, for example, be implemented using techniques described in U.S. Pat. No. 6,690,585, entitled "Bi-directional DC power conversion system," issued on Feb. 10, 2004.

Various features of the cable 207 shown in FIG. 2 and the cable 407 shown in FIG. 4A may be combined with each other. For example, referring to FIG. 4B, another system 400b is shown including a cable 447 having the same AC adaptor 408 and thin cable segment 436 as the cable 407 shown in FIG. 4A, but which includes a docking module 448 in place of the DC-DC charger 430 shown in FIG. 4A. The docking module 448 may include DC-DC charger 450 and otherwise be implemented in the same manner as the docking module 208 shown in FIG. 2, except that the docking module 448 shown in FIG. 4B lacks the AC adaptor 212 of the docking module 208. This enables the AC adaptor 408 of the cable 447 shown in FIG. 4B to be implemented as a conventional AC adaptor.

Figure 4B:
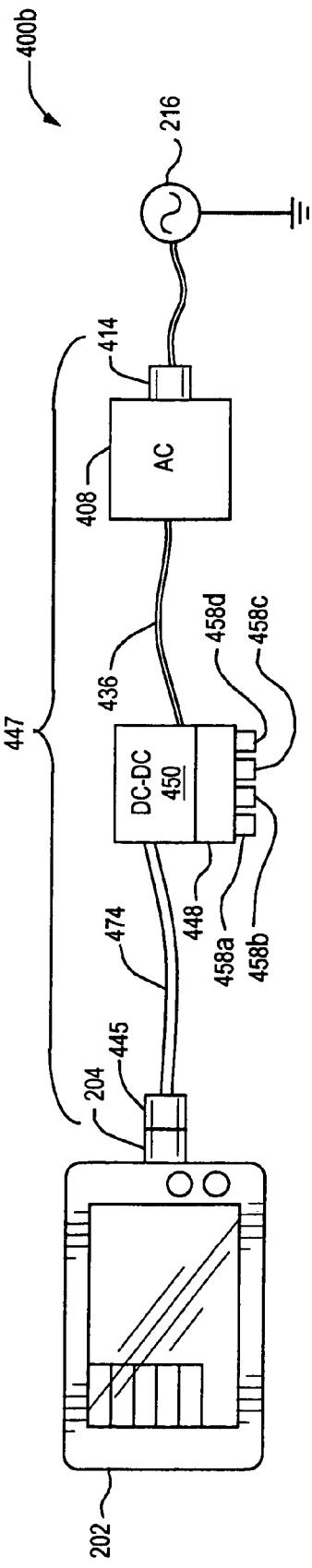
FIGS. 4B-4C are diagrams of systems including combined power/docking cables according to various embodiments of the present invention.

The configuration shown in FIG. 4B also enables the cable segment 436 to be relatively thin. Cable 447 also includes cable segment 474, connecting the docking module 448 to computing device 202 at connectors 204 and 445. Cable segment 474 may be thicker than cable segment 436. Connectors 458a-d of docking module 448 may be used to connect the docking module 448 to one or more peripheral devices (not shown), in a similar manner to that shown in FIG. 2.

The docking module 448 shown in FIG. 4B may perform the same or similar functions to the docking module 208 shown in FIG. 2 and the DC-DC charger 430 shown in FIG. 4A. For example, the docking module 448 may receive a power signal the AC adaptor 408, use DC-DC charger 450 to perform a step up or step down conversion on the power signal, and transmit the resulting power signal to computing device 202 on cable segment 474. Furthermore, docking module 448 may receive one or more I/O signals from one or more peripheral devices, and transmit the I/O signal(s) to computing device 202 on cable segment 474.

Figure 4C:
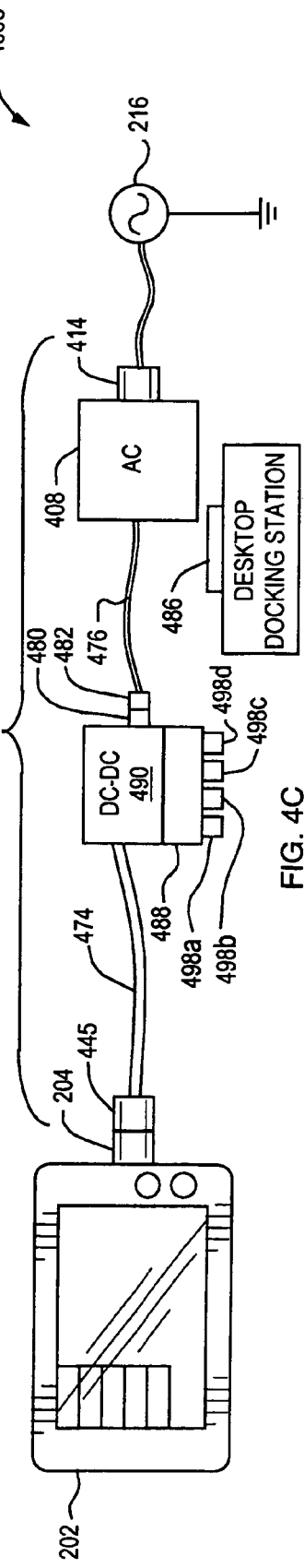

The docking module 448 need not be connected to the AC adaptor 408. For example, as shown in FIG. 4C, another system 400c is shown including a cable 487 having the same AC adaptor 408 as the cable 447 shown in FIG. 4B. The cable 487 shown in FIG. 4C also includes a docking module 488, which is similar to the docking module 448 of FIG. 4B. For example, the docking module 488 of FIG. 4C includes DC-DC charger 490 and ports 498a-d for connecting to peripheral devices. In the system 400c shown in FIG. 4C, cable segment 476 coupled to AC adaptor 408 includes a terminating connector 482. Docking module 488 includes its own connector 480. When connectors 480 and 482 are connected to each other, the system 400c of FIG. 4C operates in a manner similar to the system 400b of FIG. 4B.

The connectors 480 and 482, however, may be detached from each other, thereby disconnecting the docking module 488 (and the computing device 202) from the power source 216. Once disconnected, the docking module 488 may continue to provide the docking functions described above, e.g., transmitting I/O signals between the computing device 202 and any peripheral device(s) connected to the docking module 488.

Once the connector 482 has been disconnected from connector 480, the connector 482 may be connected to a connector 486 of a desktop docking station 484 to provide the docking station 484 with power. Examples of desktop docking stations are disclosed in commonly-owned U.S. Pat. App. Pub. No. US 2005/0185364 A1, entitled "Docking Station for Mobile Computing Device," published on Aug. 25, 2005.

Figure 5:
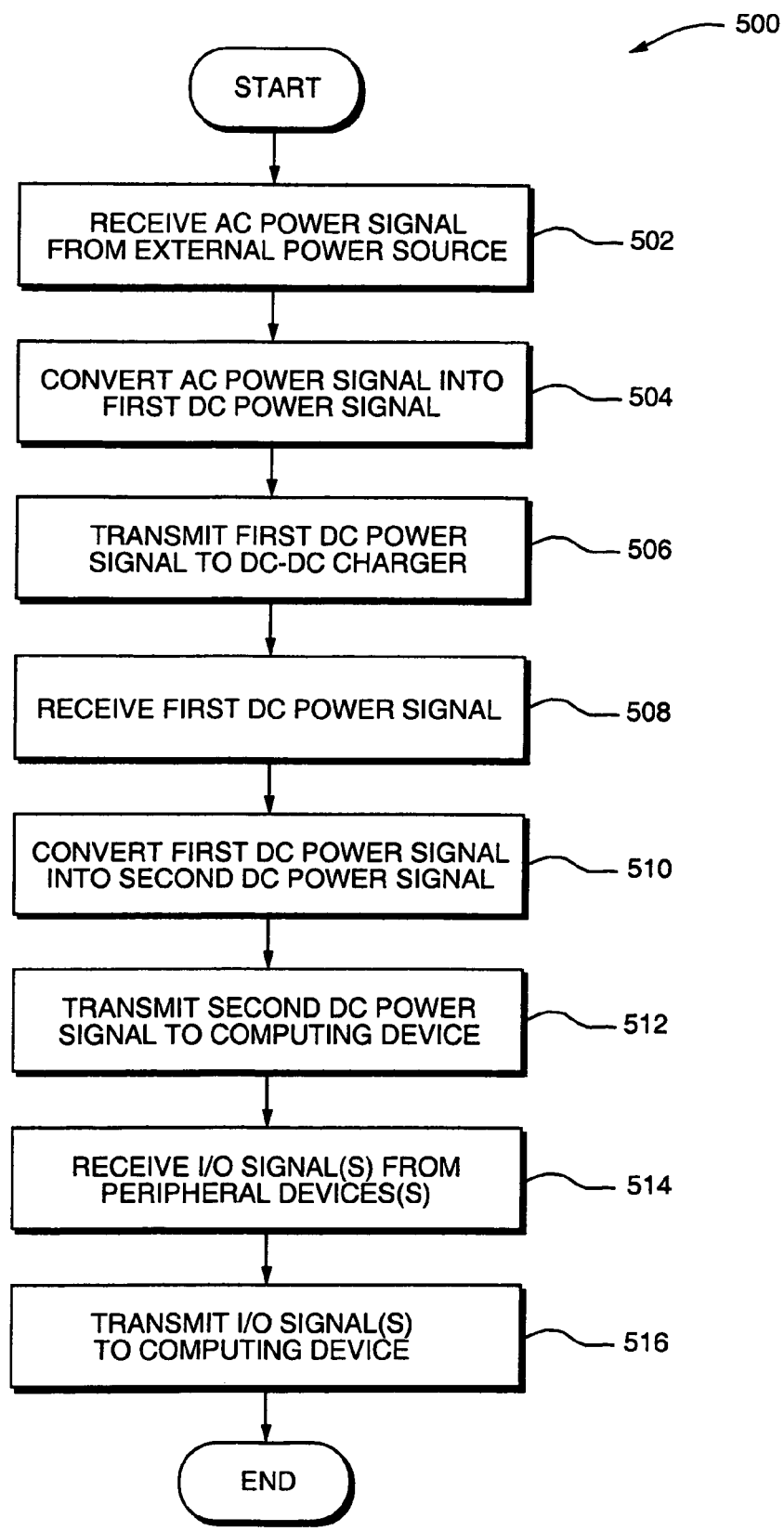
FIG. 5 is a flowchart of a method performed by the systems of FIGS. 4A-4C according to various embodiments of the present invention.

Referring to FIG. 5, a flowchart is shown of a method 500 performed by one or more of the systems 400a-c shown in FIGS. 4A-4C according to various embodiments of the present invention. The AC adaptor 408 receives a power signal from the AC power source 216 at port 414 (step 502). The AC adaptor 408 converts the AC power signal into a first DC power signal (step 504), which the AC adaptor 408 transmits to DC-DC charger 430, 450, or 490 (step 506).

The DC-DC charger receives the first DC power signal (step 508), and performs a step-up or step-down conversion on the first DC power signal to produce a second DC power signal (step 510). The DC-DC charger transmits the second DC power signal (e.g., on cable segment 434 or 474) to the computing device 202 (step 512).

In the case of systems 400b-c (FIGS. 4B-4C), the docking module 448 or 488 may receive at least one I/O signal from at least one peripheral device connected to the docking module (step 514). The docking module may transmit the I/O signal(s) to the computing device 202, e.g., over cable segment 474 (step 516).

The devices shown in FIGS. 4A-4C have a variety of advantages, including but not limited to the following. Separating the DC-DC charger from the AC adaptor enables the thickness of most of the cable (i.e., the cable segments 436 and 476 in FIGS. 4A-4C) to be reduced. This makes the cable lighter and less unwieldy. Further, the separation of the DC-DC charger and the AC adapter enables the AC adapter, which generates a relatively high level of electromagnetic interference (EMI), to be placed far away from the computing device 202 and its user, while allowing the relatively low-EMI DC-DC charger to be closer to the computing device 202.

Furthermore, separating the AC adaptor 408 from the DC-DC charger enables a standard AC adaptor to be used, even if the computing device 202 has non-standard DC current needs. This reduces the total cost of the cable in comparison to designs incorporating custom AC adaptors. This feature also provides greater flexibility in the choice of AC adaptor. For example, a U.S., European, or other AC adaptor may be used as the AC adaptor 408 without otherwise altering the design of the cable. Furthermore, using the design of FIG. 4C, in which the AC adaptor 408 is detachable from the docking module 488, different AC adaptors may be swapped in for use with the same docking module 488.

The systems 400*b-c* of FIGS. 4B-4C, which include docking modules 448 and 488, reduce the length of cable from the computing device 202 to the I/O ports 458*a-d* and 498*a-d* in comparison to the system 200 shown in FIG. 2, thereby making the I/O ports easier for the user to access, while still separating the I/O ports from the computing device 202 itself, and thereby reducing the overall volume and mass of the computing device 202.

In both the system 200 of FIG. 2 and the systems 400*a-c* of FIGS. 4A-4C, it is important to protect the signal integrity of the I/O signals transmitted to the computing device 202 against the potential disruptive effectives of EMI noise generated by the DC power signal transmitted to the computing device 202.

When USB signals are transmitted to the computing device 202, the cable itself has three properties which together make it an effective medium to send USB signals adjacent to a power signal. First, USB uses a digital signal protocol. The digital nature of the signal makes small fluctuations in energy levels less likely to be misinterpreted. Second, USB cable is run as a twisted pair. As the lines are run entwined with one another, EMI effects on the signal are more likely to be experienced as common mode noise. Third, the cable has a built-in EMI shield along its length.

When Ethernet signals are transmitted to the computing device 202, the cable has four properties which together generate sufficient protection against the EMI that could be generated by the DC power cable. First, Ethernet cable makes use of a pair of transformers at its end which are used to measure signal deltas. This makes common mode noise substantially less disruptive to the signal. Second, although Ethernet is not digital, it makes use of a small number of discreet signal states which provides the signal medium some of the benefits of digital transmission. Third, the Ethernet cable is shielded. Fourth, the Ethernet cable is in a twisted pair, with the added synergistic benefit of the transformer which makes the device resistant to a common mode noise.

When audio signals are transmitted to the computing device 202, the cable has two properties which together generate sufficient protection against the EMI that could be generated by the DC power cable. First the audio signal is shielded through the use of a coaxial cable. Second, audio signals are tolerant of EMI and degrade gradually.

When video signals are transmitted to the computing device 202, the cable may have various properties which together generate sufficient protection against the EMI that could be generated by the DC power cable. For example, the video signal may be shielded through the use of a shielded, braided, foil cable. Furthermore, video signal cables use ferrite beads to reduce EMI. Moreover, copper tape may be used over the connector/braid to reduce interference.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The particular cables and connectors disclosed herein are provided merely as examples. Cables implemented in accordance with embodiments of the present invention may include any number and type of connectors in any combination. For example, a single cable may include multiple connectors of the same type (e.g., USB), or multiple connectors of differing types.

Cable segments (such as cable segments 206, 434, 436, 474, and 476) may have any length. Short segments, for example, may be desirable to make a cable easier to store/transport, while longer segments may be desirable to make the cable easier to connect to devices that are far away from the computing device 202. The cable and/or segments of it may be retractable to enable their lengths to vary.

What is claimed is:

1. A device comprising:
 a cable segment that transmits power from an external power source to a computing device and transmits a plurality of I/O signals from a plurality of peripheral devices to the computing device;
 a first connector coupled to the cable segment, and adapted to connect to a port of the computing device through which the power and the I/O signals pass;
 a docking module, coupled to the cable segment, the docking module comprising:
  an AC power adaptor suitable for connection to the external power source;
  a DC-DC charger coupled to the AC adaptor; and
  a plurality of additional connectors adapted to connect to a plurality of ports of a plurality of peripheral devices.

2. The device of claim 1, wherein the cable segment further comprises a first end and a second end, wherein the first connector is coupled to the first end of the cable segment, and wherein the docking module is coupled to the second end of the cable segment.

3. The device of claim 1, wherein the DC-DC charger comprises a step-up converter.

4. The device of claim 1, wherein the DC-DC charger comprises a step-down converter.

5. The device of claim 1, wherein the DC-DC charger comprises means for transferring power from the computing device to a plurality of peripherals devices.

6. The device of claim 1, wherein the plurality of I/O signals comprises a plurality of data signals.

7. The device of claim 1, wherein the plurality of I/O signals comprises a plurality of control signals.

8. The device of claim 1, wherein a single line transmits the power and the I/O signals.

9. The device of claim 1, wherein the plurality of additional connectors comprises at least one of a Universal Serial Bus connector, an audio connector, an IEEE standard 802.3 connector, and a Video Graphics Array connector.

* * * * *